United States Patent Office 3,523,074
Patented Aug. 4, 1970

3,523,074
NOVEL LUBRICATING OIL SYSTEM AND
OIL FILTER FOR INTERNAL COMBUS-
TION ENGINES
Jerome Geyer, Elizabeth, and Shih-En Hu, Roselle, N.J.,
assignors to Esso Research and Engineering Company,
a corporation of Delaware
No Drawing. Continuation-in-part of application Ser. No.
665,249, Sept. 5, 1967. This application Dec. 16, 1968,
Ser. No. 784,179
Int. Cl. C10m *11/00;* F01m *9/00;* B01d *39/00*
U.S. Cl. 208—179                                  14 Claims

ABSTRACT OF THE DISCLOSURE

Lubricating oil treatment for internal combustion engines involves the circulation of oil from the engine through an oil filter or a solids-oil contacting chamber and returning the oil to the engine. The system contains a filter cartridge within the filter or it contains a solids-oil contacting chamber. An additional solids-oil contacting chamber may be used either before or after the filter. The filter and/or contacting chamber contains at least one relatively oil-insoluble solid inorganic compound having a metal-containing cation moiety and an anion moiety, wherein the cation metal is selected from Groups III-A, IV-A or V-A of the Periodic Table, which metal may be combined with or complexed in either its reduced state or its fully oxidized state, with anionic ligands, neutral ligands or mixed ligands, the metal complex being the cation, or the cation may be the metal alone.

---

This application is a continuation-in-part of our copending application Ser. No. 665,249, filed Sept. 5, 1967.

DESCRIPTION OF THE INVENTION

The present invention relates to a lubricating oil circulating system used in association with internal combustion engines and which involves the circulation of mineral lubricating oil from the crankcase of internal combustion engines, through a filter or a solids-oil contacting chamber, and the return of the so treated oil into the internal combustion engine for reuse therein. More particularly, the invention relates to oil filters and, or, optionally, a solids-oil contacting chamber alone, or ahead of or after the oil filter for contacting the oil with inorganic compounds or complexed inorganic compounds wherein there is contained in the oil treating filter or chamber at least one relatively oil-insoluble solid inorganic compound having a metal moiety selected from Groups III-A, IV-A and V-A of the Periodic Table and an anion moiety. By incorporating such metal compounds into the filter or other chamber, in the solid state or impregnated onto a carrier or packing material, it is possible to maintain the lubricating oil in a fresher condition, freer from sludge, and decomposition products, and the internal engine surfaces cleaner, with a minimum of corrosion-forming tendencies, than has heretofore been possible to attain. The cations may be complexes of these metals wherein the cation metal is complexed in either reduced state or fully oxidized state with Lewis bases, such as anionic ligands, neutral ligands, or mixed ligands. See the bottom of page 670 and chaper 25 of Brescia et al., "Fundamentals of Chemistry," Academic Press (1966). The compounds of these metals may also be simple or binary metal cation compounds instead of the complexed or ternary (metal complexed cation) compounds, in which case the metal above is the cation.

Lubricating oils, especially those used for the lubricating of internal combustion engines, are required to withstand severe superatmospheric temperature conditions. Their failure to withstand such temperatures comes about by reason of the presence of products of combustion (oxides of nitrogen) and the incompletely oxidized fuel components with the resultant formation and presence of oxidized compounds, such as oxides of nitrogen, carboxylic acids, aldehydes, ketones, epoxides and the like which together constitute partially oxidized sludge precursors, and which individually and collectively create sludge problems. The degradation of lubricating oils is also a problem but not to the extent that the blow-by of combustion products is a problem. Present day requirements for lubricating oils require temperature stability because temperatures of the oil, oftentimes, approach 300° to 400° F. under heavy duty service conditions. Many attempts have been made to impart to lubricating oils, operating under severe service conditions, oxidative stability, so that these oils, over longer periods of time, resist degradation with the resultant accompanying sludge formation and the attendant difficulties encountered by reason of such sludge formation. Corrosion of the metal internal surfaces of engines lubricated with oils is also of grave consideration under these extreme conditions of engine operation. It is also desirable to maintain a minimum of nitrogen oxides and oxidized hydrocarbon fuel constituents in the oil in order to avoid sludge formation to as great an extent as is possible. Nitrogen in the air introduced into combustion chambers and subjected to combustion becomes fixed so that oxides of nitrogen are eventually formed. These substances and the partially oxidized (incompletely combusted) fuel hydrocarbons find their way into the crankcase as blow-by and become mixed with the lubricating oils. It is already well known that the presence of these sludge precursors in such oils induces rapid sludge formation.

In the past, some control of actual oxidation within the lubricating oil itself has been achieved to some extent by the addition of organic oxidation inhibiting agents to the oils. In many instances, although these agents have helped to control the oxidation of the oil, because of the nature of the specific additive employed, other characteristics such as thermal stability, changes in viscosity, viscosity index, and lubricity, etc., are sometimes simultaneously adversely affected. Most of the organic antioxidant addition agents heretofore employed have a high degree of oil solubility because it is desired that these agents intimately contact all portions of the oil, the bearing surfaces, and the internal metal surfaces of the engine during its operation. Many times it has been necessary to add an excess of these organic oxidation inhibiting substances in order that the point at which they have been completely consumed or broken down will substantially coincide with, or exceed, the point in time of use at which the oil will normally be replaced anyhow. The problem has most always been attacked by attempting to homogeneously distribute the desired antioxidant or acid neutralizing agents to the entire quantity of the oil present in the engine for the entire length of time that the oil is present in the engine. This, of course, has required that the additives be completely soluble or almost completely soluble in the oil.

The present invention is directed to the correction of the problems of sludge formation and corrosion that have previously existed. However, a different approach is involved. Instead of attempting to impart degradative resistance to the lubricating oil by means of oil-soluble organic additives, resort is had to the use of agents which are, for the most part, more water-soluble than they are oil-soluble because it has now been recognized that, to a large extent, the corrosiveness and sludging of the oil comes about by reason of a first formation of the oxidized species of fuel hydrocarbons and oxides of nitrogen formed in the combustion chambers and blown past the piston rings into the oil. The hereinafter described novel procedure does not attempt to insure the absence of oxidized species in the lubricating oil system, but it assures a quick and prompt treatment of these substances, once they enter the oil, with inorganic substances containing the aforementioned metal cations either as simple metal cation compounds or as compounds having complexed cations or anions. Such metal-containing compounds tend to minimize the sludge forming tendencies of such blow-by products of combustion in the oil.

The treating substances, which are solid, inorganic in nature, and relatively oil-soluble, may be one of two different types, a mixture of both types, or mixtures of compounds of the same type.

The first type is a simple or binary inorganic compound wherein the cation is a metal only and selected from Groups III–A, IV–A or V–A of the Periodic Table of the Elements as published by E. H. Sargent & Company of Chicago, Ill., copyright 1964.

The metal cation can be of a reducing nature or it can be fully oxidized. It can be a multivalent metal or aluminum which, in chemically combined form, has only a +3 valence.

Suitable metallic cations, in their lower valence state, are for example $Pb^{+2}$, $Bi^{+3}$, $Sn^{+2}$, $Sb^{+3}$ and $Tl^{+1}$. Suitable anions, of either reducing or non-reducing effect, may be used such as: sulfides, sulfoxylates, hyposulfites, sulfites, and dithionites, phosphides, hypophosphites, metaphosphites, pyrophosphites, orthophosphites, and hypophosphates. The anions joined with the metallic reducing cations are fluorides, chlorides, bromides, iodides, carbonates, acetates, oxalates, oxides, alkoxides, thiocyanates, ferricyanides, ferrocyanides, phosphates, sulfates, oxysulfates, oxyhalides, tellurides, selenides, etc. The efficacy of the binary compounds, however, does not depend on the state of oxidation of either the cation or anion moieties.

The second type of inorganic compounds that are useful are those containing cations of any of the metals of Groups III–A, IV–A and V–A of the Periodic System, wherein the cation also contains a Lewis base, i.e., such as an anionic ligand, a neutral ligand or mixed ligands. Such complexed cations of the aforementioned metals with any of the aforementioned reducing or non-reducing anions function effectively in inhibiting sludge formation. Suitable ligands that are useful are: ammino ($NH_3$), cyano, amido, chloro, hydroxy, iodo, oxalalic, sulfato, carbonyl, thiourea, glycinate, etc.

The first mentioned types of inorganic compounds are referrer to as simple or binary compounds. This term refers to compounds composed of a metal only as the cation and a simple or complexed anion such as chloride, sulfate, cyanide, ferrocyanide and the like. The second type of inorganic compound as referred to above is considered to be complex or "ternary" in nature. As used herein, complexed or ternary compounds are composed of a cation portion and an anion portion wherein the metal in the cation is complexed with a Lewis base such as those ligands previously mentioned. The ternary compound contains at least one ligand in association with the metal, the metal complex acting as a unitary cation. The anion moiety may be a single element, a group of elements, such as $SO_4$ or a complexed group of elements, such as ferrocyanide.

The principal metal-containing cations which have been found to be useful when employed in solid form or impregnated on a carrier placed in the filter, in the filter element contained in an oil filter, or in a separate solid-oil contacting chamber may be exemplified by the following relatively oil-insoluble solid compounds:

aluminum acetyl acetonate;
aluminum isopropoxide;
aluminum ammonium hydroxide;
aluminum ammonium chloride;
aluminum ammonium bromide;
aluminum iodide;
aluminum sulfide;
aluminum oxychloride;
aluminum cyano bromide;
aluminum cyano chloride;
aluminum ethyl dichloride;
aluminum diethyl chloride;
tri-n-butyl aluminum;
tri-methyl bismuth;
antimony oxy chloride;
antimony phosphate;
antimony sulfate;
antimony telluride;
antimony tribromide;
antimony trifluoride;
antimony trisulfidle;
antimony triiodide;
antimony ammonium phosphate;
antimony cyano sulfate;
bismuth hydroxide;
bismuth oxybromide;
bismuth oxychloride;
bismuth oxyiodide;
bismuth phosphate;
bismuth phosphite;
bismuth sulfate;
bismuth sulfite
bismuth triiodide;
bismuth trichloride;
bismuth tribromide;
bismuth ammonium sulfate;
bismuth cyano phosphate;
lead bromide;
lead iodide;
lead arsonite;
lead cyanamide;
lead ferro cyanide;
lead sulfite;
lead thiocyanate;
lead oxylate;
lead oleate;
lead metaphosphate;
lead pyrophosphate;
lead phosphite;
lead selenide;
lead stannate;
lead sulfide;
lead borate;
lead dichloride;
diethyl lead dichloride;
lead ammonium ferro cyanide;
lead cyano acetate;
triphenyl lead acetate;
stannous acetate;
stannous bromide;
stannous chloride;
stannous fluoride;
stannous iodide;
stannous ferro cyanide;
stannous ferric cyanide;
stannous oxychloride;
stannous phosphite;
stannous phosphate;
stannous sulfate;
stannous oxide;
stannous sulfide;
stannous telluride;

stannous selenide;
stannous phosphite;
stannous ammonium phosphate;
stannic ammonium chloride;
stannous cyano sulfate;
stannic cyano acetate;
n-butyl tin trichloride;
tri-n-propyl tin oxide;
trimethyl tin hydroxide;
tributyl tin sulfide;
hexaphenyl di-tin;
di-n-propenyl tin dichloride;
thallium acetate;
thallium bromide;
thallium iodide;
thallium chloride;
thallium sulfite;
thallium sulfide;
thallium ammonium trichloride;
thallium cyano sulfite.

Many other specific compounds could be mentioned which would successfully operate in accordance with the teachings of the present invention. Almost any anion having the required negative valence state can be employed including anions having, by their very nature, an oxidative effect such as nitrate which might be thought to be self defeating for the purposes of successfully treating lubricating oils but, in fact, are not although their presence is not as effective as many other anions.

One of the objects of the present invention is to prevet or minimize the formation of further oxidation of the blow-by or the products in lubricating oils during their usage in the operation of internal combustion engines. It is therefore, undesirable and working at cross purposes, to employ anions having a strong oxidative action.

Many of the heretofore specific inorganic compounds exist in anhydrous form and in many instances hydrates of these compounds are most readily available commercially. The hydrates may exist when more than one molecule, in fact, several moles of water are crystallized in association with their structures. In many instances, the hydrate form is the most commonly marketed form and is thus more generally readily available. There is little point, if this is the case, in attempting to employ the anhydrous form of the metal compounds for the reason that once the compounds are incorporated into the oil system as hereinbefore described, almost immediately small amounts of water already present in the lubricating oil or eventually are present in the lubricating oil and will contact the anhydrous salts at any event so that they are in effect converted to the hydrated form if not, in fact, dissolved in the small amounts of already water present. Mixtures of two or more of the above-defined types of binary or ternary compounds and of two or more of the specific complexed compounds set forth may also be employed as well as mixtures of other types of compounds with them.

The solid inorganic particles employed may range in size from between about −4 and about +250 mesh, preferably between about −20 and about +150 mesh Tyler screen size. Particles as small as 25 microns average diameter or larger may be used since most retainer screens and commercially available oil filters effectively retain solid particles of this size or larger. The solid particles should not be, in any event, of sufficiently small size that any substantial quantity of them will pass through the filter packing material and be circulated in the oil.

Another method which may be employed for incorporating the compounds into the oil filter or the solids-oil contacting chamber is to impregnate the filter packing material, porous paper, for example, or any other carrier, with an aqueous solution of such salts, in cases where the salts are readily water soluble, after which the impregnated material, may be gently heated to dryness to drive off the water and to maintain the compounds in intimate association with the packing material. No specific minimum amount of the treating inorganic compound is necessary or found to be critical, it being sufficient that all or a portion of the filter element, i.e., the packing in the filter, or the carrier either contain impregnated thereinto one or more oft he aforementioned compounds in solid form or that solid particles in sufficient amount to inhibit corrosion and degradation and sufficiently large to be retained in the filter element or contact chamber filtered with a retainer such as a fine mesh screen are placed in and retained. Solid particles of sufficient coarseness to be retained in the filter or other chamber or packing or carrier material may be positioned at the inlet side of the chamber or between layers of packing or carrier materials so as to be largely retained therein for the service life of the filter or chambers. Usually, the screen retainer is of a fine mesh screen (i.e., 50 to 100 mesh) and serves as a support and retainer for the solid particles.

No specific structural design of the filter element is necessary. Preferably, the solid particles of treating agents should be retained in the filter and not be entrapped or carried with the oil from the filter packing chamber, or filter, to the engine, although some small amounts in colloidal form or dissolved in the entrained water may be removed from the filter and be carried into the crankcase oil sump. In ordinary automotive internal combustion engines having an oil capacity of 4 or 5 quarts of lubricating oil, the oil filter or other chamber should contain, either as such or impregnated on the filter medium, between about 10 and about 150 grams of the selected metal compounds in solid form. Such an amount is sufficient to enable the filter to retain, during its normal life of operation, solid compounds over and beyond that amount taken up by any water with which the solid compounds come into contact during the course of the normal operation of the engine between oil changes. If desired, however, it is, of course, proper that larger or smaller amounts of such compounds be incorporated depending upon the particular usage of the engine and the amount of engine running time elapsing between filter changes or chamber rechargings.

If a filter, or carrier medium, is to be employed, (in practical operation this is advantageous) it is preferable that it be a relatively porous carrier and that it be relatively inert with respect to the oil and to the inorganic compounds. Any inert carrier is suitable, particularly a porous one, so long as the size of the solid particles is sufficiently large to be retained in the filter during operation of the engine and during the circulation of the oil through the filter. Suitable carrier substances include porous paper, diatomaceous earth, kaolin, kieselguhr, activated clay, charcoal, or fullers earth, although any other inert, relatively porous or nonporous carrier is equally as useful so long as the carrier retains the solid inorganic metal compounds within the filter and solids-free oil, as an effluent from the filter, is permitted to be returned to the engine for reuse. In some cases, even coarse sand, which is inert, may serve as the filtering medium so long as it is retained within the filter and is not carried by the effluent oil to the engine.

The oils employed in association with the present invention are those customarily employed in lubricating internal combustion engines including automotive engines, diesel engines, both of the light and heavy duty types, and, in fact, for lubricating any engine employing lubricating oils for the purpose of lubricating the bearings, cylinder walls, valves, etc., of such engines. These oils are many and of varied types. The invention and its success in the use of the inorganic metal cation compounds in oil filters does not depend upon the use of any particular lubricating oil but is applicable to all such oils heretofore used in these lubrication systems. As is well known and recognized, these oils may be of paraffinic, naphthenic or mixed types and they may contain the conventional additives which are customarily employed in such oils such as, for example, viscosity index (V.I.) improvers, pour point depressants, antioxidants, sludge dispersants, antiwear agents, etc.

In the comparative runs set forth in the following examples, a base blend of a solvent extracted neutral Mid-Continent oil of SAE 10W-30 grade was employed. It contained conventional additives, i.e., about 10% of its weight of the V.I. improver, polyisobutylyene, between about 3.5 and about 4 wt. % of a dispersant which was a polyisobutenylsuccinic anhydride imide derivative of tetraethylenepentamine and small amounts of a wax alkylated naphthalene as a pour point depressant, an antioxidant and an antiwear agent, namely, the zinc salt of di($C_4$-$C_5$ alkyl) dithiophosphate. Additionally, it contained less than 1% of an overbased calcium petroleum sulfonate. The oil, as compounded, has a pour point of about —20° F. maximum and a V.I. of about 136 minimum. As illustrative of the character of the invention but with no intention of being limited thereby the following examples are set forth.

EXAMPLE 1

A Ford 6-cylinder engine was run in a cyclic temperature series of tests. The base oil blend employed was that previously described. In one series of tests, a filter commercially available on the open market as a standard filter in automotive lubricating systems was employed; it consisted of a porous paper packing or filter element and had interspersed within the paper filter element in separate porous paper containers a total of about 52 grams of the inorganic compound being tested, or Ottawa sand, as a control. In each case, the test material employed had an average mesh particle size of between about —20 and about +40 standard Tyler screen size. The sand, however, had about a 30-40 mesh screen size on the same basis.

The comparative Cyclic Temperature Sludge Test was carried out as follows. The engine was run through alternate temperature controlled cycles. The spark timing was set at 11° BTC (before top center). The air to fuel ratio was maintained between 13.7:1 and 14.5:1 and the engine was placed under constant load of 140 foot lbs. of torque and was run at 1500 r.p.m., ±15 r.p.m. The first cycle lasted 5 hours and the oil sump temperature was maintained at 10° F., ±5° F. Following this, a second cycle lasted 2 hours, the oil sump temperature being maintained at 21° F., ±5° F. The two cycles were alternated, in sequence, until the desired total test hours had elapsed. Make-up oil was added as required so as to maintain the oil level in the crankcase at all times between about 5 and 5½ quarts. At the end of selected periods of test time, the engine was inspected by disassembling it sufficiently to permit visual examination of the several parts, including the rocker arm assembly, rocker arm cover, the cylinder head, the push rod chamber and its cover, the crank shaft, and the oil pan. These parts were visually and quantitatively rated for sludge deposits using a CRC (Coordinating Research Council) Sludge Merit Rating System in which a numerical rating of 10 represents a perfectly clean part and the numerical scale decreases to a minimum value representing a part covered with the maximum amount of sludge possible. The sludge merit ratings are averaged to give an overall engine merit rating. In all tests, the filter element was one made of paper and is readily available on the open market. The comparative tests gave the following data:

| Test hours | Sand | Stannous chloride | Aluminum isopropoxide |
|---|---|---|---|
| 63 | 10.0 | 10.0 | 10.0 |
| 105 | 9.2 | 10.0 | 10.0 |
| 147 | 6.0 | 9.1 | 9.9 |
| 168 | | 8.3 | 9.9 |
| 189 | | 6.0 | 9.6 |
| 273 | | | 6.0 |

It is readily apparent that sludge formation was markedly decreased when using aluminum isopropoxide over the amount of sludge formation obtained in the control run. In fact, to obtain the same degree of sludge formation, the aluminum isopropoxide run was almost twice as long as the control run, and the stannous chloride run was nearly 30% longer than the control run to obtain the same amount of sludge formation and engine sludge deposition.

Having now thus set forth the general nature and the specific embodiments of the invention, what is desired to be secured by Letters Patent is:

1. A lubricating oil system for lubricating internal combustion engines with a mineral lubricating oil and involving the circulation of such oil, the improvement which comprises employing a solids-oil contacting chamber in the oil circulating system containing at least one relatively oil-insoluble solid compound capable of inhibiting sludge formation selected from the group consisting of binary and ternary compounds whose cations contain a metal of Groups III-A, IV-A and V-A of the Periodic System, and whose anions do not exert a reducing effect in the system, the size of the metal compound particles being sufficiently large to be retained in said solids-oil contacting chamber.

2. In a lubricating oil system for lubricating internal combustion engines with a mineral lubricating oil and involving the circulation of such oils through a filter, the improvement which comprises employing a filter containing at least one relatively oil-insoluble solid compound capable of inhibiting sludge formation selected from the group consisting of binary and ternary compounds whose cations contain a metal of Groups III-A, IV-A and V-A of the Periodic System, and whose anions do not exert a reducing effect in the system, the size of the metal compound particles being sufficiently large to be retained in said filter.

3. A system as in claim 2 wherein the solid compound is a binary compound whose cation is selected from the group consisting of antimony, aluminum and tin.

4. A system as in claim 2 wherein the solid compound is a ternary compound whose metal cation also contains a complexed ligand.

5. A system as in claim 2 wherein the solid compound is associated with an inert carrier selected from the group consisting of porous paper, diatomaceous earth, kaolin, kieselguhr, activated clay, charcoal, and fullers earth.

6. A system as in claim 3 wherein the solid compound is stannous chloride.

7. A system as in claim 2 wherein the solid compound is aluminum isopropoxide.

8. A system as in claim 4 wherein the solid compound is aluminum ammino chloride.

9. An oil filter through which circulating mineral lubricating oil is passed in connection with the operation of internal combustion engines, said filter containing retained therein solid particles of an oil-insoluble solid compound capable of inhibiting sludge formation selected from the group consisting of binary and ternary compounds whose cations contain a metal of Groups III-A, IV-A and V-A of the Periodic System, and whose anions do not exert a reducing effect when said compounds contact the oil.

10. An oil filter as in claim 9 wherein the solid compound is a binary compound whose cation is selected from the group consisting of antimony, aluminum, and tin.

11. An oil filter as in claim 9 wherein the solid compound is a ternary compound whose metal cation also contains a complexed ligand.

12. An oil filter as in claim 10 wherein the solid compound is stannous chloride.

13. An oil filter as in claim 10 wherein the solid compound is aluminum isopropoxide.

14. An oil filter as in claim 11 wherein the solid compound is aluminum ammino chloride.

References Cited

UNITED STATES PATENTS

| | | | |
|---|---|---|---|
| 1,713,250 | 5/1929 | Blumenberg | 210—501 |
| 2,057,414 | 10/1936 | Briggs et al. | 210—502 |
| 2,083,546 | 6/1937 | Aldham | 210—501 |
| 1,594,335 | 7/1926 | Sweetland | 208—179 |
| 3,080,214 | 3/1963 | Duke et al. | 210—502 |

HERBERT LEVINE, Primary Examiner

U.S. Cl. X.R.

208—180; 210—501, 503; 123—196